United States Patent [19]

Netting et al.

[11] 4,411,847

[45] Oct. 25, 1983

[54] PROCESS FOR SURFACE MODIFIED HOLLOW MICROSPHERES

[75] Inventors: David I. Netting, Springfield; Bruce D. Spivack, Norristown; James P. Cunnion, Jr., Bridgeport, all of Pa.

[73] Assignee: PQ Corporation, Valley Forge, Pa.

[21] Appl. No.: 382,826

[22] Filed: May 27, 1982

Related U.S. Application Data

[62] Division of Ser. No. 161,473, Jun. 20, 1980, Pat. No. 4,340,642.

[51] Int. Cl.³ .............................................. B29C 25/00
[52] U.S. Cl. ........................................ 264/7; 264/233; 264/340; 428/402; 428/406; 501/35
[58] Field of Search ............... 106/47 R, 52; 264/233, 264/7, 340; 428/402, 406

[56] References Cited

U.S. PATENT DOCUMENTS

| | | | |
|---|---|---|---|
| 3,337,321 | 8/1967 | Teague et al. | 427/238 |
| 3,794,503 | 2/1974 | Netting | 264/13 |
| 3,796,777 | 3/1974 | Netting | 264/13 |
| 3,888,957 | 6/1975 | Netting | 264/13 |

*Primary Examiner*—Jay H. Woo
*Assistant Examiner*—W. Thompson
*Attorney, Agent, or Firm*—Ernest C. Posner; Fred C. Philpitt; J. S. Stephen Bobb

[57] ABSTRACT

Non-fused hollow glass microspheres that consist primarily of silicate are rendered more water-resistant by treatment with multivalent metals. The hollow microspheres are slurried with water and then a solution of a multivalent metal salt such as $Al_2(SO_4)_3$ is added to the slurry. The rate of the addition is controlled so that the pH can be regulated. Separating, washing and drying complete the preparation.

12 Claims, No Drawings

PROCESS FOR SURFACE MODIFIED HOLLOW MICROSPHERES

This application is a division, of application Ser. No. 161,473, filed June 20, 1980 now U.S. Pat. No. 4,340,642 issued July 20, 1982.

BACKGROUND OF THE INVENTION

This invention relates to the treatment of silicate based hollow microspheres to improve their stability in aqueous environments. The invention comprises treating said microspheres with multivalent metal ions, thereby modifying the surface of the microspheres.

Hollow microspheres such as those described in U.S. Pat. Nos. 3,796,777; 3,794,503 and 3,888,957 are formed by spray drying alkali metal silicate solutions that have been combined with "polysalt" solutions. While these products are satisfactory for use in essentially non-aqueous environments, they are sufficiently sensitive to water to prevent their universal acceptance in aqueous systems.

Fused glasses, used in bottles and similar items, have been treated with multivalent metal ions to improve weathering qualities of the product. Such treatment consists of the vapor phase reaction of a compound such as aluminum chloride with the glass as it is cooling from fabricating temperatures of up to 1000° C. During this time, glass is considered to be in its most reactive state. U.S. Pat. No. 3,337,321 and Swedish Pat. No. 10372/1955 (issued May 4, 1961) illustrate such processes.

SUMMARY OF THE INVENTION

The water resistance of non-fused hollow microspheres consisting largely of silicate can be improved by modifying their surfaces with suitable multivalent metal ions. Such modification is achieved by adding solutions containing appropriate metal salts such as $AlCl_3$ or $Al_2(SO_4)_3$ to aqueous slurries of the microspheres while controlling the pH. The microspheres recovered from the slurry and then dried are found to be water resistant and are useful in aqueous environments.

THE INVENTION

Hollow microspheres primarily comprising silicate that have not been fused or sintered require surface modification to provide stable properties on exposure to aqueous environments. While many materials benefit from the process of our invention, we prefer to use the hollow microspheres described in U.S. Pat. Nos. 3,794,503; 3,796,777 and 3,880,957. These patents are hereby incorporated by reference as describing the preferred hollow microspheres and the method of preparing them in detail.

Hollow microspheres are prepared by spray drying a homogeneous solution of sodium silicate and a "polysalt." The product from the spray dryer has a particle diameter of 35 to 150 microns (100 to 400 mesh) and less than 25% moisture. This product is heated and the resulting microspheres have diameters of about 35 to 2000 microns (10 to 400 mesh), bulk densities of 2 to 20 lbs/cu. ft. and less than 7% moisture. The ratio of polysalt solids to sodium silicate solids is 0.02:1 to 2.0:1 and the sodium silicate contains 1.5 to 4.0 moles of $SiO_2$ per mole of $Na_2O$. U.S. Pat. No. 3,794,503 describes "polysalts" as salts with anion to cation ratios that are reduced when the salts dissolve and become hydrolyzed. Ammonium pentaborate, sodium pentaborate and sodium hexametaphosphate are preferred "polysalts," of which ammonium pentaborate is the most preferred.

Either the intermediate product from the spay dryer or the product from the final drying step can be processed according to our process. The microspheres are slurried with water and agitated while a solution containing the multivalent ion is added slowly to said slurry. The pH of the slurry is controlled by varying the rate at which the solution is added. After the solution has been added and the ion exchange completed, the microspheres that remain floating are separated from the liquid and dried, thereby recovering the improved product. The microspheres may be washed before drying.

Any multivalent metal that achieves the desired decrease in solubility of the microspheres is useful in the process of our invention. Examples include among others calcium, magnesium, aluminum and zinc. Such metals are used as the salts of strong acids such as chloride, nitrates, sulfates and the like. The salts are dissolved in any manner required to form a stable solution at a somewhat acid pH. The amount of metal ion required depends on the composition of the microspheres and the degree of property modification desired. In general, 1 part by weight (pbw) is required for each 2 to 20 pbw of microspheres.

The microspheres either from the spray dryer or the second heating step must be slurried with sufficient water to prevent shearing stress and consequent fractures of the microspheres. We find that about 5 to 20% by weight of hollow microspheres is satisfactory. Stirring must be adequate to ensure good mixing when the metal salt solution is added. The rate at which said metal salt solution is added must be controlled to provide a pH in the range which promotes the yield of intact spheres with the desired surface modification. Surprisingly, this pH range must be varied according to the silicate used in preparing the microspheres. If the silicate used had up to about 2.4 moles of $SiO_2$ per mole of $Na_2O$ the pH must be maintained above about 5 with the preferred range of 5.0 to 7.0. If the silicate had about 2.4 to 4.0 moles of $SiO_2$ per mole of $Na_2O$ the pH can be as low as 4 with a preferred range of 4.0 to 6.5. Once all of the metal salt solution has been added and the slurry is at the correct pH it can be stirred for an additional period of up to an hour to provide time for the surface reaction to be completed.

A preferred embodiment of the process of our invention is carried out as follows. The sodium silicate and "polysalt" solutions are combined and then spray dried to provide hollow microspheres of 18 to 25% moisture and a particle size of 35 to 150 microns. This material is slurried with sufficient water to allow stirring without fracturing the microspheres. Then the metal salt solution is added at a rate which controls the pH in the required range. Additional pH buffers and adjusting agents may be added to provide the correct pH. After the reaction is complete the floating microspheres are separated from the slurry, washed, dried and expanded by heating, thereby providing the desired product.

The drying and expanding involves heating the microspheres to about 300° to 450° C. over a period of several hours in successive steps.

Our product, a surface modified hollow microsphere, has a particle diameter of about 35 to 2000 microns, a bulk density of 2 to 20 lb/cu.ft. and less than 7% moisture. The composition of the microsphere now includes from 0.1 to about 5.0% of the multivalent metal. The exact mechanism by which the multivalent metal is incorporated into the microsphere is not fully understood, but it appears that it does replace some of the alkali metal from said composition.

The water resistance imparted to the hollow microspheres is measured by slurrying the product in water, determining the percentage of floating material after 1 hour and after 24 hours. Comparison of the two results is a measure of the insoluble character of the material and, of course, the smaller the difference between the microspheres floating after 1 hour and after 24 hours the greater the water resistant character.

The product of our process is useful in any of the usual applications of hollow microspheres, and especially useful in aqueous systems.

EXAMPLES

The following examples illustrate certain embodiments of the process of our invention. The purpose of these examples does not include establishing the scope of the invention which is defined in the disclosure and claims.

Our test for water resistance was carried out as follows. Two grams of the microspheres were placed in 200 ml of deionized water in an Erlenmeyer flask. The flask is shaken continuously using a wrist shaker. The percentage of floating spheres is determined after 1 hour and after 24 hours, and the difference in the percentages reported. The floating material is measured by allowing the slurry to sit until the solid and liquid phases separate, usually about 1 hour. The floating hollow microspheres are skimmed from the surface of the water and washed into a tared sample cup. Any remaining floating spheres adhere to the edge of a weighed filter paper which is placed in the sample cup. The samples are dried at 103° C. for 24 hours before final weighing.

EXAMPLE 1

This example illustrates the process of our invention employed in improving the water resistant character of a hollow microsphere made with sodium silicate having 2.0 moles of $SiO_2$ per mole of $Na_2O$. The microspheres were prepared as described in Example 1 of U.S. Pat. No. 3,796,777. The final product had the following properties:

| | |
|---|---|
| $SiO_2$ | 56% |
| $Na_2O$ | 28% |
| $B_2O_3$ | 12.7% |
| $H_2O$ | 3.3% |
| True Density | 12 lb/cu. ft. |

Three slurries containing 15% of these microspheres in water were prepared and stirred. Solutions containing 12% of $MgCl_2$, $Ca(NO_3)_2$ and $Al_2(SO_4)_3$ were added slowly to these slurries so that the pH of the material did not go below 5.0. In each case, sufficient slurry was added to provide 1 pbw of the metal for each 5 pbw of the microspheres. After all of the metal solution was added, the slurries were stirred for an additional 15 minutes. The floating spheres were separated, washed and dried. The microspheres were dried by heating at 105° C. for 18 hours.

The product microspheres and the raw material were tested as previously described and the results are summarized in the following table.

| Treatment | Floaters 1 hr. (%) | Floaters 24 hrs. (%) | Change (%) |
|---|---|---|---|
| None | 61.2 | 10.5 | 50.7 |
| $MgCl_2$ | 82.0 | 68.3 | 13.7 |
| $Ca(NO_3)_2$ | 78.8 | 66.8 | 12.0 |
| $Al_2(SO_4)_3$ | 89.0 | 83.0 | 6.0 |

These results definitely show the improvement desired in the treated microspheres with the aluminum treatment appearing to be the best.

EXAMPLE 2

The process described in Example 1 was repeated except that the intermediate spray-dryer product was used. This material had the following properties:

| | |
|---|---|
| $SiO_2$ | 50.8% |
| $Na_2O$ | 25.4 |
| $B_2O_3$ | 11.6 |
| $H_2O$ | 12.2 |

All reaction conditions were the same except that the drying step was as follows: 24 hours at about 100° C., 1 hour at 150° C., 1 hour at 200° C. and 3 hours at 300° C. The results were comparable to those reported in Example 1.

EXAMPLE 3

This example illustrates the preparation of an improved product by the process of our invention carried out on a microsphere prepared with a sodium silicate with 2.4 moles of $SiO_2$ per mole of $Na_2O$. These microspheres had the following properties:

| | |
|---|---|
| $SiO_2$ | 59.4% |
| $Na_2O$ | 23.1% |
| $B_2O$ | 10.2% |
| $H_2O$ | 5.3% |

A slurry containing 12% of the microspheres in water was stirred while slowly adding a 0.45 M solution of $Al_2(SO_4)_3 18H_2O$. The rate of addition was controlled to maintain the pH at 4.0 or above and sufficient of the solution was added to provide 3.33 pbw of microspheres for each pbw of the salt. After the addition was completed, stirring continued for 15 minutes during which time the pH rose to 5.5. The floating microspheres were separated, washed and dried. Drying included 18 hours at 105°–115° C., an hour each at 150° C. and 200° C., and 3 hours at 300° C.

The product microspheres and the raw material microspheres were tested as previously described and the results are summarized in the following table:

| Treatment | Floaters 1 hr. (%) | Floaters 24 hrs. (%) | Change (%) |
|---|---|---|---|
| None | 72.5 | 59.6 | 13.1 |
| $Al_2(SO_2)_3 3H_2O$ | 80.0 | 76.2 | 3.8 |

These results show the improvement desired.

We claim:
1. A process for preparing water resistant hollow microspheres being characterized by:
   a. preparing a slurry of hollow microspheres in sufficient water to prevent shearing stress, said micro- spheres having 0.02 to 2.0 parts by weight of polysalt solids for each part by weight of sodium silicate solids, said sodium silicate having 1.5 to 4.0 moles of $SiO_2$ per mole of $Na_2O$, a particle size of 35 to 2000 microns, a bulk density of 2 to 20 lbs/cu.ft. and less than 7% moisture;

b. stirring said slurry while adding a solution of a salt of a multivalent metal and a strong acid, said multivalent metal being one that decreases the solubility of the microspheres in water, the rate of addition of said solution being controlled in a pH range that promotes the yield of intact microspheres with the desired decreased water solubility;

c. stirring after the addition of the multivalent metal salt solution is complete;

d. separating the floating microspheres from the slurry; and e. washing, drying and recovering the desired product.

2. A process for preparing water-resistant hollow microspheres being characterized by:

a. preparing a slurry of hollow microspheres in sufficient water to prevent shearing stress, said microspheres having 0.02 to 2.0 parts by weight of polysalt solids for each part by weight of sodium silicate solids, said sodium silicate having 1.5 to 4.0 moles of $SiO_2$ per mole of $Na_2O$, a particle size of 35 to 150 microns, and 18 to 25% moisture;

b. stirring said slurry while adding a solution of a salt of a multivalent metal and a strong acid, said multivalent metal being one that decreases the solubility of the microspheres in water, the rate of addition of said solution being controlled in a pH range that promotes the yield of intact microspheres with the desired decreased water solubility;

c. stirring after the addition of the multivalent metal salt solution is complete;

d. separating the floating microspheres from the slurry, washing the microspheres; and e. drying said microspheres in a manner that expands them to a particle size of 35 to 2000 microns and a moisture content of less than 7%.

3. The process of either of claims 1 or 2 wherein the multivalent metal is calcium, magnesium, aluminum or zinc.

4. The process of either of claims 1 or 2 wherein the polysalt is ammonium pentaborate, sodium pentaborate or sodium hexametaphosphate.

5. The process of claim 3 wherein the polysalt is ammonium pentaborate, sodium pentaborate or sodium hexametaphosphate.

6. The process of either of claims 1 or 2 wherein the slurry prepared in step a. contains 5 to 20% by weight of said microspheres.

7. The process of either of claims 1 or 2 wherein the silicate contains from 1.5 to 2.4 moles of $SiO_2$ per mole of $Na_2O$ and the pH of step b. is maintained above 5.

8. The process of claim 7 wherein the pH is between 5.0 and 7.0.

9. The process of claim 3 wherein the sodium silicate has 1.5 to 2.4 moles of $SiO_2$ per mole of $Na_2O$ and the pH of step b. is between 5.0 and 7.0.

10. The process of either of claims 1 or 2 wherein the silicate has from 2.4 to 4.0 moles of $SiO_2$ per mole of $Na_2O$ and the pH of step b. is maintained above about 4.0.

11. The process of claim 10 wherein the pH is between 4.0 and 6.5.

12. The process of claim 3 wherein the sodium silicate has 2.4 to 4.0 moles of $SiO_2$ per mole of $Na_2O$ and the pH of step b. is between 4.0 and 6.5.

* * * * *